United States Patent [19]
Rosen

[11] 4,010,978
[45] Mar. 8, 1977

[54] TAKE DOWN BLOOD DONOR SEATING APPARATUS

[76] Inventor: Evan W. Rosen, 110 S. Cuesta, Tucson, Ariz. 85705

[22] Filed: Dec. 15, 1975

[21] Appl. No.: 640,870

[52] U.S. Cl. ............................................. 297/239
[51] Int. Cl.² ......................................... A47C 3/04
[58] Field of Search ............... 5/8; 108/91; 297/239

[56] References Cited

UNITED STATES PATENTS

| 3,338,591 | 8/1967 | Rowland | 297/239 X |
| 3,612,565 | 10/1971 | Zimmerman | 297/239 X |

FOREIGN PATENTS OR APPLICATIONS 309,475   3/1969   Sweden ............................. 297/239

*Primary Examiner*—James C. Mitchell

[57] ABSTRACT

An integrated chair ensemble having nestable components transportable upon a dolly is disclosed. Each chair includes a contour body support structure supported upon a base; the body support structure is pivotable to provide a selectable upright or reclining position. The dolly serves to transport a plurality of nested sets of seats and bases to and from location and also serves as a recovery lounge or stretcher for donors in the event of a reaction due to the loss of blood.

4 Claims, 12 Drawing Figures

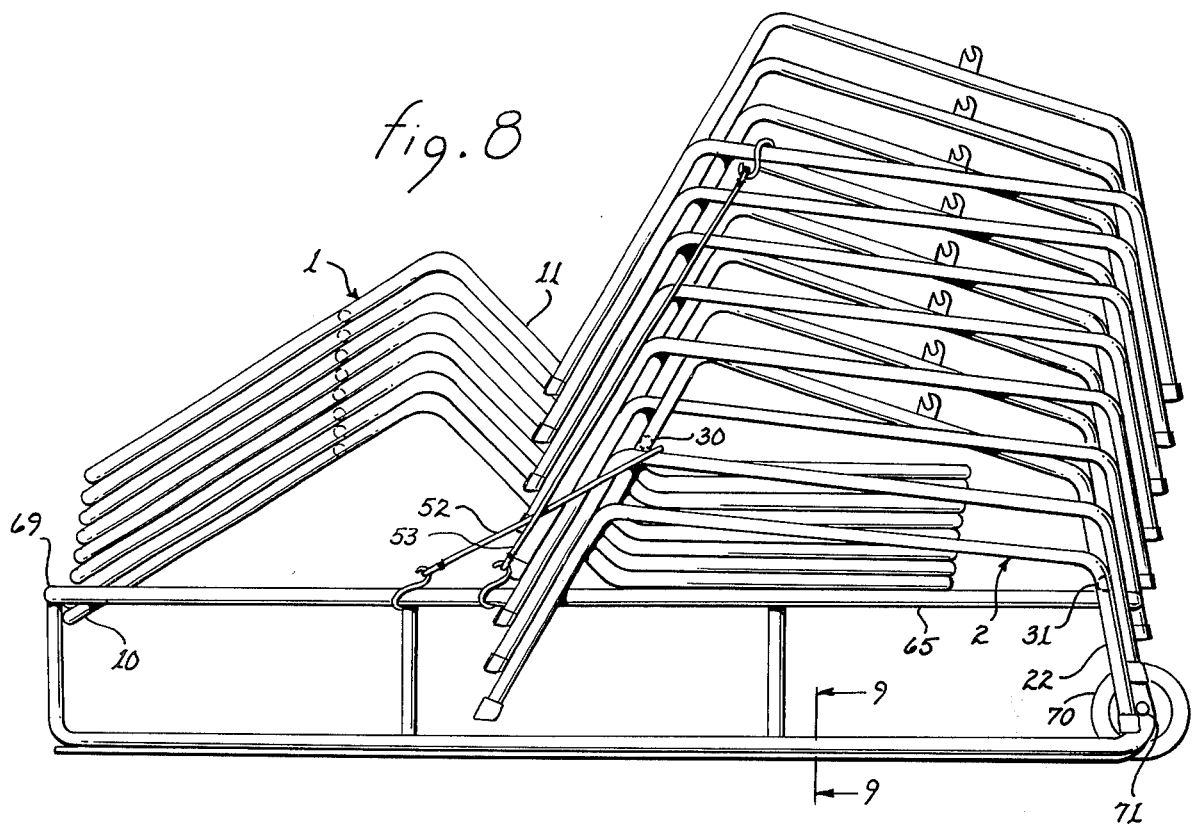
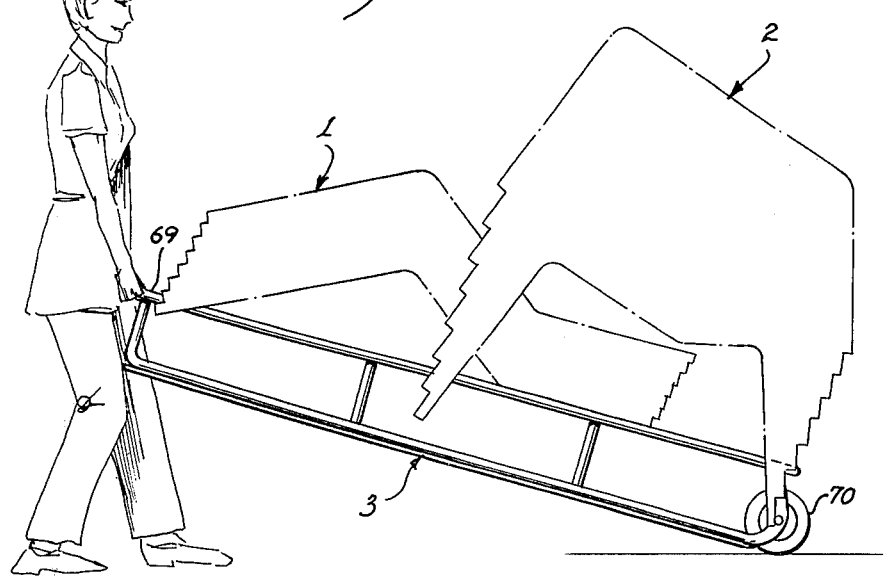

TAKE DOWN BLOOD DONOR SEATING APPARATUS

The present invention relates to blood collection equipment and, more particularly, to take down furniture for blood donors.

Presently, most medical treatment institutions have a continuing need for fresh blood. The fresh blood is either administered directly or converted into plasma for later use. In order for the institution to obtain blood donors, a continuous program must be maintained to induce the donors to visit the institution. Because of the attendant inconvenience to the donors, the response is usually barely satisfactory.

The reduce the inconvenience to blood donors and to facilitate large volume blood collection, many profit and non-profit organizations have turned their attention to the business of collecting blood. Usually, such organizations make periodic visits to office buildings, factories, stores and the like which have a high density of potential blood donors during normal business hours. The personnel attending to the collection of blood generally travel in vans in order to transport the necessary blood collection associated equipment and supplies. Usually, no recliners and no chairs, other than folding beds, are transported because such items are cumbersome, heavy and awkward to transport within the vehicle and difficult to maneuver into and out of the visited facility. Accordingly, existing furniture within the facility must be employed.

Very often, the furniture available for use by donors during the blood collection process and during the recovery period is only minimally satisfactory from the standpoint of comfort, health and good will of the donor. Moreover, couches or beds are almost never available to accommodate blood donors who suffer temporary nausea or disorientation due to the loss of blood. Therefore, the act of blood donation tends to be a very unpleasant experience for the donor and it creates severe hesitancy on the part of the donor to repeat the process at a later date. A response of this type is, of course, highly detrimental to the success of a blood collection program and severely constrains future blood collection drives.

It is therefore a primary object of the present invention to provide an easily transportable apparatus directed to the comfort, health and good will of donors participating in a blood collection program.

Another object of the present invention is to provide a compactly nestable reclinable chair ensemble which is transportable to and rapidly erectable at any facility.

Still another object of the present invention is to provide a set of take down reclinable chairs which are nestable upon a dolly.

Yet another object of the present invention is to provide a lightweight stretcher which serves as a dolly for a set of take down nestable reclinable chairs.

A further object of the present invention is to provide a two-piece take down chair selectively positionable in an upright position or in a reclining position with a quick release latch that automatically resets when the chair is returned to its upright position.

A still further object of the present invention is to provide an integrated chair ensemble of eight chairs mounted upon a stretcher and transportable within a van.

A yet further object of the present invention is to provide a dolly for an integrated chair ensemble having storage capability for blood donor related equipment.

These and other objects of the present invention will become apparent to those skilled in the art as the description thereof proceeds.

The present invention may be described with greater specificity and clarity with reference to the following drawings, in which:

FIG. 8 is a side view of the nested bases and body support structures mounted upon the dolly.

FIG. 11 is a side view depicting transportation of the ensemble.

Figure 1:
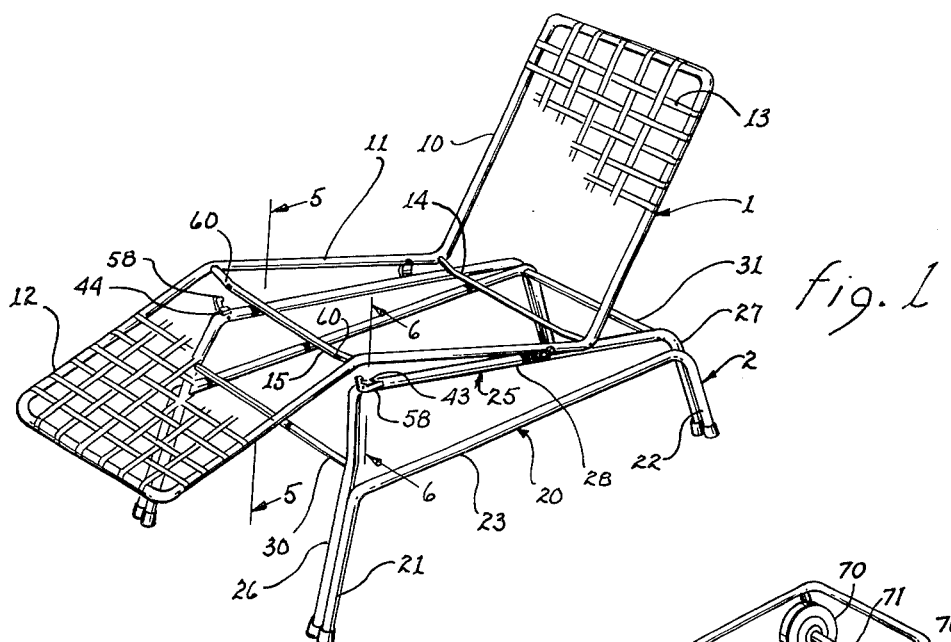
FIG. 1 illustrates a contoured nestable reclinable chair having a contoured body support structure pivotally supported upon a base.

Referring to FIG. 1, there is illustrated a contoured body support structure 1 pivotally and disconnectably mounted upon a base 2. The body support structure is formed of a tubular frame defining a backrest 10, a seat 11 and a leg rest 12. Longitudinally and laterally woven webbings 13 extend across the frame to establish the pertinent supporting surfaces. Cross braces 14 and 15 provide structural rigidity and maintain conformity between the longitudinally oriented webbings and the frame.

Figure 3:
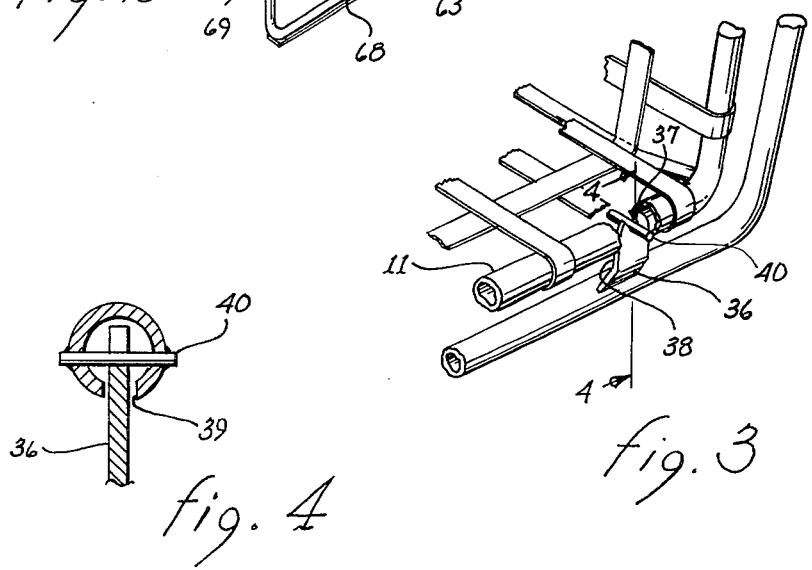
FIG. 3 illustrates the disconnectable pivot mechanism interconnecting the body support structure and the base.
Figure 5:
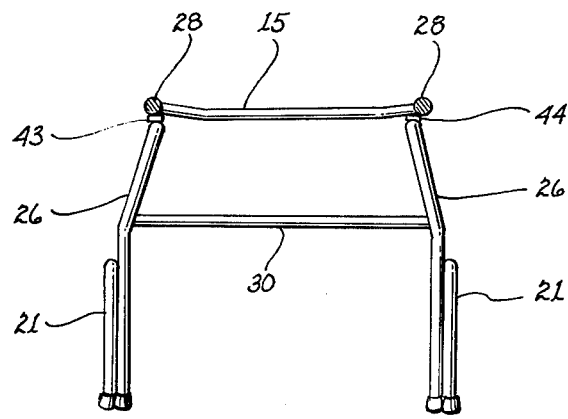
FIG. 5 is an end view of the body support structure and base taken along lines 5—5, as shown in FIG. 1.

Each side of base 2 is formed by an inverted U-shaped member 20 having legs 21 and 22 extending downwardly from a base 23 and a member 25 having bent legs 26 and 27 extending downwardly from a base 28. Legs 21 and 22 of member 20 are attached to legs 26 and 27 of member 25, respectively, to the extent that the legs are adjacent one another. For the sake of clarity in terminology, the portion of U-shaped member 25 coincident with the legs of U-shaped member 20 will be termed the "lower part" and the non-coincident portion of U-shaped member 25 will be identified as the "upper part". As depicted in FIG. 1 and for reasons which will become apparent as the description continues, the upper part is angled or canted inwardly and away from a plane defined by U-shaped member 20. Further, bases 28 of opposed members 25 slope rearwardly and downwardly. As also illustrated in FIGS. 3 and 5, such canting places bases 28 within the lateral confines of frame 1, while the legs (the lower part) are external to the lateral dimension of the frame. A rod 30 extends intermediate opposed legs 26 of U-shaped members 25 at a point approximately coincident with the line of demarcation between the lower and the upper part. A similar rod 31 extends intermediate opposed legs 27 of U-shaped member 25 from a point approximately coincident with the line of demarcation between the lower and the upper part.

The interconnection between body support structure 1 and base 2 will be described with greater specificity by joint reference to FIGS. 1, 3, 4 5 and 6. A pivot bracket 36 extends outwardly and upwardly from the center section of base 28. The bracket includes an upwardly and forwardly oriented funnel shaped slot 37 which is terminated by a semi-circular bearing surface 38. A slot 39 is disposed within the bottom of the tubing of seat 11 to accommodate penetration into the tubing by bracket 36. A pin 40 extends horizontally across the tubing upwardly of the slot; the diameter of the pin is commensurate with funnel shaped slot 37 and bearing surface 38 such that the pin rests upon and is pivotally supported by the bearing surface. The pin and bracket, in combination, permit the body support structure to the tilted from a forward upright position to a rearward reclining position.

To prevent the pinching of one's fingers intermediate the tubing of seat 11 and base 28 as body support structure 1 is placed into the upright position from the reclining position, standoffs 43 and 44 may be employed. These standoffs are attached to base 28 in proximity to the junction between the base and leg 26 such that further downward pivotal movement of the seat is inhibited upon contact by cross brace 15 with the standoffs. By appropriate dimensioning of the heights of the standoffs 43 and 44, sufficient clearance would be maintained intermediate the tubing of seat 11 and the tubing of bases 28 to permit safe insertion of an operator's fingers therebetween.

The body support structure is placed into the reclined position by tilting it rearwardly to pivot about pins 40 until cross brace 14 comes into contact with base 28. The angled orientation between base 28 and the side tubing of seat 11 permits safe insertion of an operator's fingers therebetween.

Figure 6:
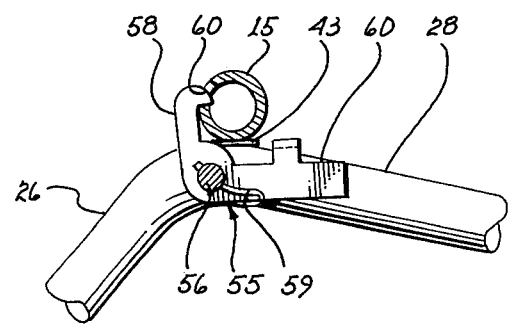
FIG. 6 is a view of a position locking mechanism interconnecting the body support structure and the base taken along lines 6—6, as shown in FIG. 1.
Figure 7:
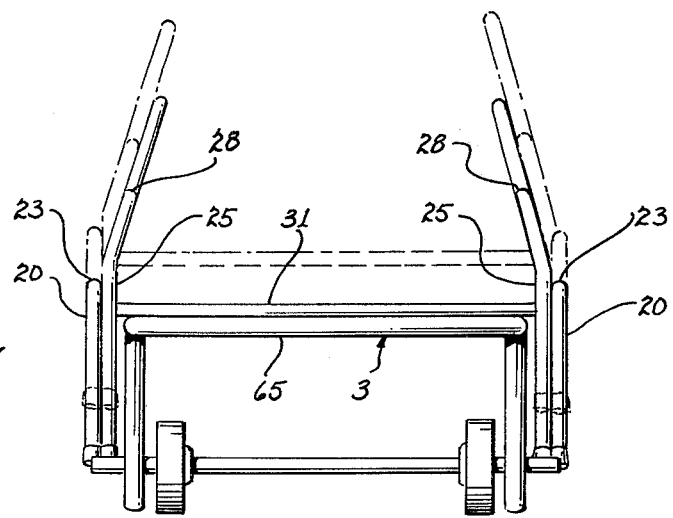
FIG. 7 is an end view illustrating the bases mounted upon the dolly.

To prevent inadvertant repositioning of body support structure 1 from the upright to the reclining position, a spring loaded latch mechanism 55, as illustrated in FIGS. 1 and 6, may be employed. A pin 56 extends laterally from the side of the base 28 in proximity to the junction of leg 26. A manually operated latch 58 having an arm 57 pivots about pin 56 and is biased by means of a spring 59. The latch is pivotally repositionable for selective engagement with an aperture 60 disposed in the wall of cross brace 15.

Figure 2:
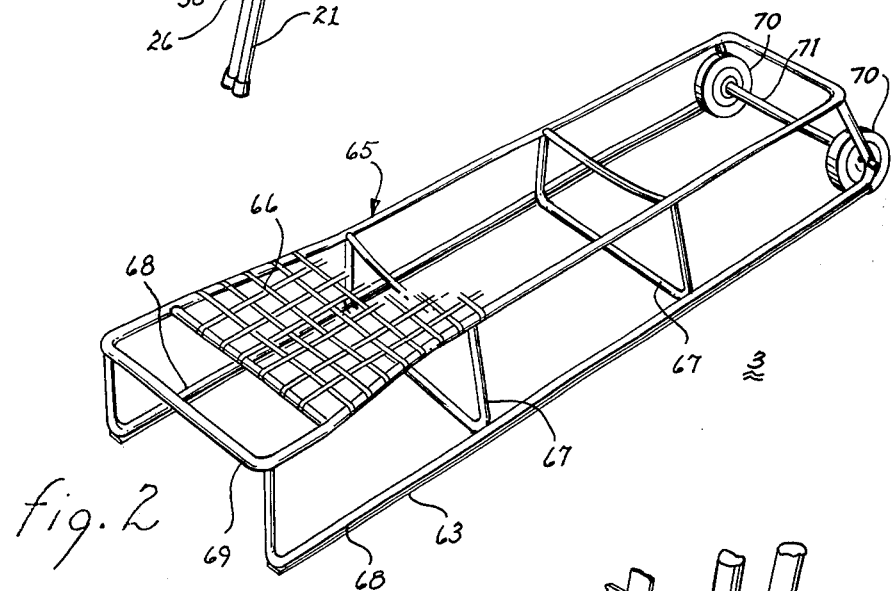
FIG. 2 illustrates a dolly which also serves as a stretcher and recovery lounge.
Figure 4:
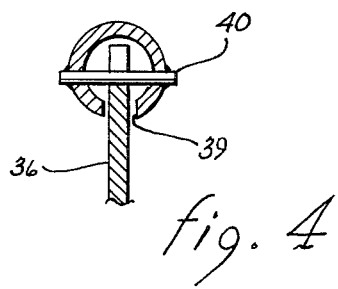
FIG. 4 is a cross-sectional view taken along lines 4—4, as shown in FIG. 3.

Referring now to FIG. 2, there is illustrated a dolly 3 having a rectangular tubular framework 65 with webbings 66 extending thereacross to establish a supporting platform. A plurality of downwardly extending transversely oriented U-shaped supports 67 are interconnected by downwardly depending longitudinally oriented U-shaped supports 68. A handle 69 is disposed in proximity to one end of framework 65 to provide a means for readily lifting the dolly and to provide a circumscribed area adjacent one end of the framework. The downwardly extending legs of supports 68 in proximity to handle 69 aid in manually maneuvering the dolly. A pair of wheels 70 is mounted upon an axle 71 and vertically oriented such that the wheels rest upon a surface coincident with the plane defined by the bases of U-shaped members 68.

Figure 9:
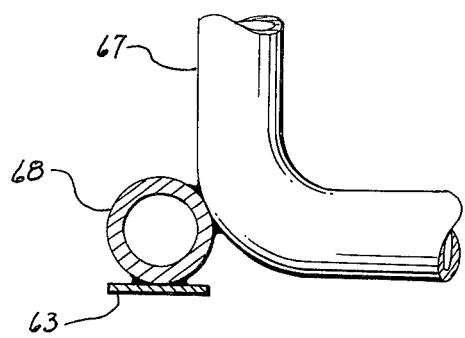
FIG. 9 is a cross-sectional view taken along lines 9—9, as shown in FIG. 8.

To aid in negotiating stairs with the dolly, a low friction strap 63 is attached to the bottom of support 68, as illustrated in FIG. 9. Thus, it becomes relatively easy to slide the dolly where necessary.

As alluded to earlier, dolly 3, because of webbing 66, will serve handily as a stretcher for any blood donors who may have to be placed in a supine position or who may have to be transported to an emergency facility to overcome their reaction to a loss of blood.

Figure 10:
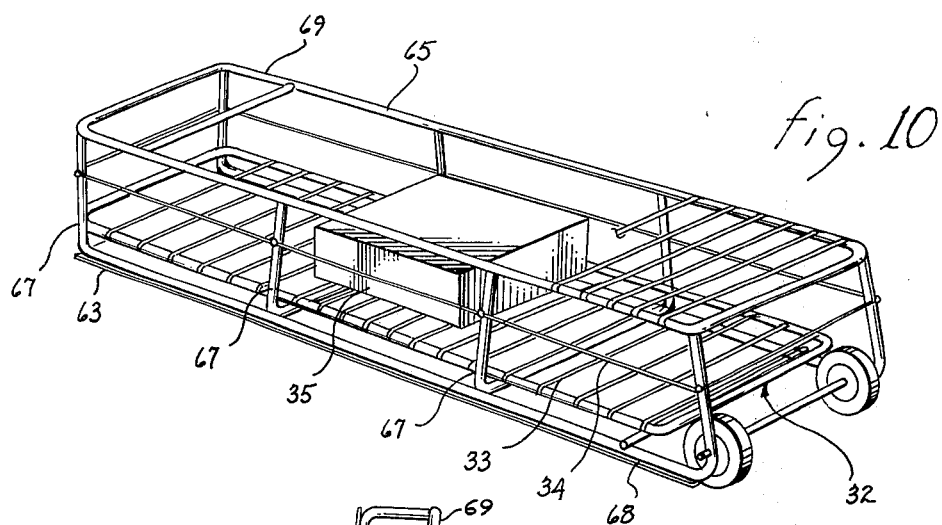
FIG. 10 illustrates a further embodiment of the dolly.

Referring to FIG. 10, there is illustrated a further embodiment of dolly 3. To add flexibility to the ensemble and decrease transportation of the blood donor associated equipment, an additional platform may be incorporated within dolly 3. A tubular rectangular framework 32 is attached interior to the upwardly extending legs of supports 67 and 68. Webbing 33, whether unidirectional or bidirectional, extends across framework 32 to define the platform. An extendable or elastic line(s) 34 encircles dolly 3 above and parallel to framework 32. The line inhibits articles, such as box 35, from inadvertently sliding off the platform. By being elastic, the line can accommodate intentional insertion and removal of box 35 and similar items.

In considering the nesting capability of bases 2 upon dolly 3, reference to FIGS. 5, 8 and 9 will be illuminating. The lateral dimension of framework 65 is limited to a dimension aproximately equivalent to the length of rods 30 and 31; to aid stacking, framework 65 may be necked to reduce the width thereof in proximity to the location of the stacked bases (see FIG. 2). Thereby, on placing a base 2 upon the platform, the base will be supported thereon by rods 30 and 31 and attached legs 21, 26 and 22, 27 will depend downwardly alongside the dolly. As noted in FIG. 1, coincident legs 21, 26 and 22, 27 are angled forwardly and rearwardly, respectively, while the upper part is canted inwardly. On placing a second base on a first base supported upon dolly 3, the inwardly canted upper part will permit nesting until the legs of the lower part are contactingly adjacent the legs of the base previously positioned upon the dolly. The next succeeding bases are similarly stacked.

Because of the accumulative weight bearing against rods 30 and 31, sufficient friction is developed to prevent aft sliding of the bases upon platform 65; forward sliding is prevented by the legs of the lowermost base contacting extensions of axle 71, as illustrated in FIG. 8. Tilting of a stack of bases is essentially impeded due to an interaction between the downwardly depending legs interferingly contacting with the legs of U-shaped members 67 and 68 of the dolly. When a loaded dolly is to be stored vertically, cinchable straps 52 and 53 may be employed to bias the stacked bases toward the dolly.

Body support structures 1 are stacked upon framework 65 upsidedown. The upper surface of leg rest 12 of the first stacked body support structure lies upon webbings 66 with seat 11 and backrest 10 extending toward handle 69. The remaining body support structures are matingly stacked upon one another.

Although either the body support structures or the bases can be stacked upon the dolly, they are normally both stacked together as they are needed to form an ensemble. To stack the ensemble, body support structures are stacked first upon dolly 3, as illustrated in FIG. 8. The first of the to be stacked bases is positioned upon the dolly such that rod 31 rests upon framework 65 and rod 30 rests upon the uppermost one of body support structures 1 in proximity to the underside of seat 11. The weight of the bases bearing against body support structure 1 producing friction intermediate the body support structures and the platform in combination with the extension of head rests 10 into the clear space defined by handle 69, establish longitudinally and laterally oriented constraints against shifting of the stack of the body support structures. The bases, supported by the lowermost rod 30 resting upon the body support structures and the lowermost rod 31, resting upon framework 65, are prevented from shifting rearwardly by friction and from shifting forwardly by contact intermediate legs 22 and axle 71. Lateral shifting is prevented by the depending legs interfering with the lateral elements of framework 65.

Figure 12:
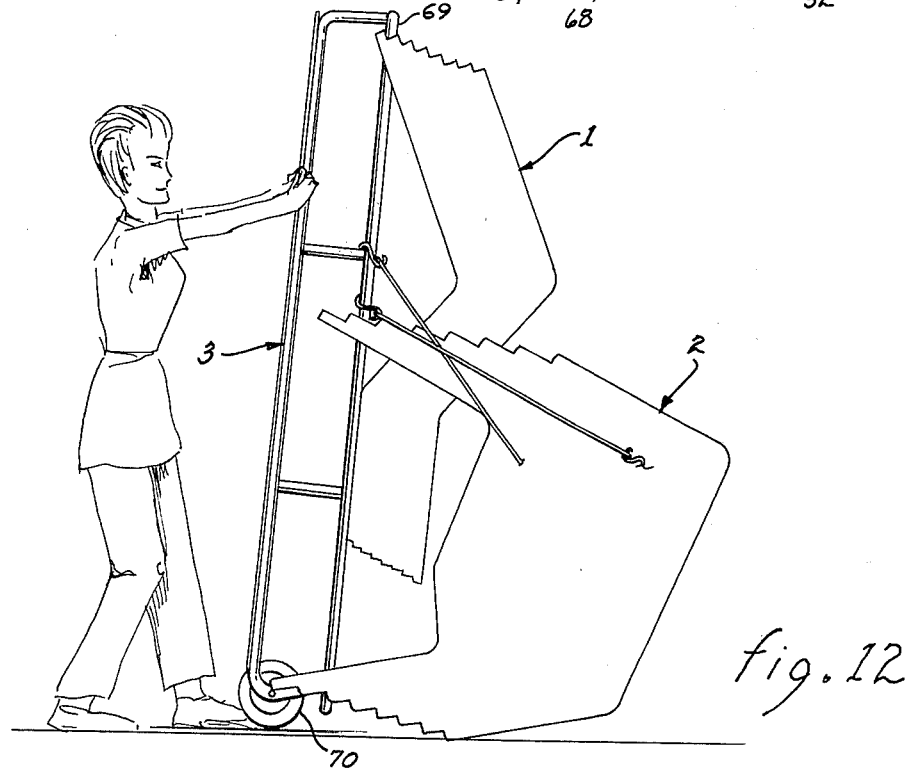
FIG. 12 is a side view depicting vertical storage of the ensemble.

As illustrated in FIGS. 11 and 12, pair of wheels 70 permits an operator to lift upon handle 69 and move, in wheelbarrow fashion, dolly 3 with its load of stacked body support structures and bases into and out of any facility. Whenever the ensemble is to be vertically oriented for transportation or storage purposes, straps 52 and 53 will maintain the body support structures 1 and bases 2 in a stacked configuration. Moreover, the nesting capability of the body support structures and the bases permits a larger number, nominally eight, of reclinable chairs to be transported within a normal sized van (i.e. 48 inches clearance height at entry). Thus, the present invention renders it possible for a blood collection organization to transport the equipment necessary for collecting blood and accompanying reclinable chairs within a single normal sized van. Hence, a completely self-contained unit can be dispatched to any given high density blood donor facility at a moment's notice.

Furthermore, the present invention renders it possible for a blood collection organization to be independent of or make any special preparations for the availability of chairs or other accommodations for the blood donors.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. An easily transported integrally nested take down chair ensemble for erecting reclinable chairs at a facility, said ensemble comprising in combination:
   a. a stretcher-like dolly for receiving and transporting said reclinable chairs to and from the facility, said dolly including a framework having webbing extending thereacross and defining a platform, a pair of wheels disposed at one longitudinal end of said dolly, and a U-shaped handle extending from another longitudinal end of said framework for defining a circumscribed area adjacent said other end;
   b. a body support structure having a backrest, a seat and a leg rest for supporting a person upon said reclinable chair, said body support structure being of a width less than the lateral dimension of said dolly to prevent lateral overhang of said body support structure upon placement of said body support structure upon said platform and having a part of the backrest extending into the circumscribed area of said dolly;
   c. a base for supporting said body support structure, said base including a pair of mirror image inverted U-shaped members interconnected by rods, each said U-shaped member including a vertically oriented lower part and an inwardly canted upper part, said lower parts of said U-shaped members being spaced apart from one another by said rods by a distance equivalent to the width of said dolly such that on placement of said base upon said dolly subsequent to placement of said body support structure upon said dolly, said platform supports one of said rods, said body support structure supports another of said rods and said lower part depends downwardly adjacent the sides of said dolly to prevent lateral movement of both said body support structure and said base with respect to said dolly;
   d. a pivot bracket extending upwardly from said upper part of each said U-shaped member for pivotally mounting said body support structure;
   e. a pair of pivot pins attached to the seat for disengageably engaging respective ones of said pivot brackets; and
   f. manually releaseable latch means disposed upon said upper part of each said U-shaped member for selectively inhibiting rearward pivotal movement of said body support structure mounted upon said base;

whereby, said dolly transports said base without danger of lateral displacement of said body support structure and said reclinable chair is readily erectable by engaging said pivot pin of said body support structure with said pivot bracket of said base.

2. The ensemble as set forth in claim 1 including a plurality of pairs of said body support structures and said bases and wherein said body support structures are contoured to permit stacking upon said dolly and wherein said lower part of each of said U-shaped members of said base includes a pair of legs slanted downwardly away from one another within the vertical plane to permit nesting of said plurality of bases upon said dolly.

3. The ensemble as set forth in claim 2 wherein said latch means comprises a latch pivotally attached to each said upper part of said base for engaging said body support structure in proximity to the junction of the seat and leg rest.

4. The ensemble as set forth in claim 3 wherein said body support structure comprises: a tubular framework defining the back rest, the seat and the leg rest, a slot disposed within each section of said tubular framework defining the lateral edges of the seat for penetratingly receiving a respective one of said pivot brackets, and each said pivot pin being disposed within said tubular framework in proximity to one of said slots for engaging one of said slot inserted pivot brackets.

* * * * *